(12) United States Patent
Sjöblom et al.

(10) Patent No.: US 6,220,040 B1
(45) Date of Patent: Apr. 24, 2001

(54) HEAT TRANSPORT APPARATUS

(76) Inventors: Hans Sjöblom, Mjölnargatan 18, S-619 00, Trosa; Anders Sjöblom, Handelsvägen 89, S-122 48, Enskede, both of (SE)

(*) Notice: Subject to any disclaimer, the term of this patent is extended or adjusted under 35 U.S.C. 154(b) by 0 days.

(21) Appl. No.: 09/331,956

(22) PCT Filed: Oct. 13, 1997

(86) PCT No.: PCT/SE97/01709

§ 371 Date: Aug. 18, 1999

§ 102(e) Date: Aug. 18, 1999

(87) PCT Pub. No.: WO98/29701

PCT Pub. Date: Jul. 9, 1998

(30) Foreign Application Priority Data

Jan. 2, 1997 (SE) .................................................. 9700008

(51) Int. Cl.$^7$ ...................................................... F25B 15/00

(52) U.S. Cl. .............................................................. 62/112

(58) Field of Search ............................ 62/112, 505, 476, 62/480, 483; 252/67

(56) References Cited

U.S. PATENT DOCUMENTS

| | | |
|---|---|---|
| 3,990,264 | 11/1976 | Patnode et al. . |
| 4,048,810 | 9/1977 | Zeilon . |
| 4,622,825 | 11/1986 | Larue et al. . |
| 4,707,996 | 11/1987 | Vobach . |
| 4,724,679 | 2/1988 | Radermacher . |

FOREIGN PATENT DOCUMENTS

| | | |
|---|---|---|
| 530406 | 11/1933 | (DE) . |
| 1125956 | 3/1962 | (DE) . |
| 419479 | 8/1981 | (DE) . |
| 3100019 | 9/1982 | (DE) . |
| 2102550 | 2/1983 | (GB) . |
| 3129957 | 2/1983 | (DE) . |
| 548005 | 11/1977 | (SU) . |

*Primary Examiner*—Corrine McDermott
*Assistant Examiner*—Malik N. Drake
(74) *Attorney, Agent, or Firm*—Young & Thompson

(57) ABSTRACT

A heat transport apparatus, comprises an absorbator (204), a desorbator (202), a compressor (206), a liquid pump (212), a heat exchanger (216), a restriction element (122) and a two-component refrigerant (203', 205'), i.e. a liquid and a gas absorbed in the liquid. The characteristic feature is that the refrigerant comprises a lubricant. In a second aspect the invention relates to a two-component refrigerant suitable for use in a heat pump of the absorption-compression type, comprising a lubricant as a liquid component, and a gaseous component absorbable in the lubricant.

30 Claims, 10 Drawing Sheets

HEAT TRANSPORT APPARATUS

The present invention relates to apparatus for transporting heat in general, and in particular to such apparatus having improved efficiency.

It also relates to a refrigerant for such an apparatus.

BACKGROUND OF THE INVENTION

Currently compressor driven heat pumps are mainly used for heating of e.g. houses and hot tap water. The characterizing feature of such a heat pump is that a liquid boils in the evaporator, whereby heat is taken up at low temperature and low pressure. The compressor pumps the gas from the evaporator into the condenser. In the condenser the gas is condensed to liquid, whereby heat is released at high temperature and high pressure. The liquid is returned to the evaporator via a restriction device.

However, the efficiency of the compressor is strongly dependent on the pressure difference across it, in the sense that the efficiency decreases drastically with increased pressure difference over the compressor.

A heat factor, F, of a heat pump is defined as the ratio between the heat delivered by the heat pump and the operating energy supplied to the heat pump. A normal yearly average of this heat factor for one compression-evaporation cycle is 2–2.5.

One way of increasing the heat factor is to lower the pressure difference across the compressor. This can be achieved by using a two component refrigerant, where one component comprises a gas being absorbed by the other component, which comprises a liquid.

A process utilizing such a two component refrigerant is operated as follows.

In the desorbator gas is released from the liquid, whereby heat is taken up at a low temperature and at a pressure corresponding to the concentration in the desorbator. The gas is pumped off by the compressor into the absorbator, where it again is absorbed by the liquid. In this process heat is released at high temperature and a pressure corresponding to the temperature and the concentration in the absorbator.

The liquid in the absorbator must not to be saturated with gas, because it would increase the pressure excessively in the absorbator, which of course is undesirable. Also the liquid in the desorbator must not be depleted of gas, because this would decrease the pressure in the desorbator too much. These two effects would cause the pressure difference across the compressor to increase. In order to prevent this to happen, liquid is pumped off by a liquid pump from the desorbator to the absorbator via a countercurrent heat exchanger. To prevent all liquid from collecting in the absorbator, liquid is drawn off via the heat exchanger and a restriction means from the absorbator to the desorbator. This is an entirely closed circulation system.

The two component refrigerant that is used is ammonia-water.

In DE-530 406 there is disclosed a method of generating cold comprising a compression refrigerating machine, operating with the ammonia-water system, wherein the compressor has been placed in the absorption liquid, in order to reduce noise, and to obtain improved cooling. Furthermore, in the disclosed device the condenser is also located within he absorption liquid, which is said to improve performance.

In SU-548005 there is disclosed a two-stage absorption compression refrigeration unit, wherein the compressor is placed inside the generator for cooling purposes, thereby improving economy.

In DE-31 29 957 there is disclosed a refrigerating machine operating with e.g. ammonia-water, and wherein the compressor has been integrated in the absorber unit.

A problem with prior art devices as discussed above, and the commercial heat pumps of today is the economy. The Carnot-efficiency is far from the optimum, and even very small improvements in this efficiency, say by 1–3%, require that substantial investments in improvements would have to made, and the equipment would therefore be too expensive to be commercially viable.

Another technical problem with the refrigerant system ammonia-water is its corrosive nature. Electrical and mechanical equipment such as pumps, and compressors and associated motors, will be subjected to an aggressive environment, and their operative life may be unduly shortened.

A drawback with current heat pumps is the necessity to cool the compressors. This is normally achieved by flowing air, but it often happens that temperatures in the vicinity of 100° C. and above are reached, which may lead to so called coking of the lubricant in the compressor.

SUMMARY OF THE INVENTION

The present invention therefore sets out to provide a heat transport apparatus, and in particular an improved heat pump system with increased efficiency, and wherein the disadvantages mentioned above are overcome.

This is achieved in accordance with the invention, with a heat transport apparatus as defined in claim 1, by using a refrigerant in the form of a two component medium comprising a lubricant as the liquid component.

For the purpose of this application, "lubricant" means any compound, substance or composition meeting the criteria of the invention, i.e. having the capability of absorbing a gas, and of being enough lubricious to enable lubrication of the moving components in the system according to the invention.

Preferably at least the compressor is integrated in a desorbator of the apparatus.

Suitably also the restriction means and the liquid pump are integrated in the desorbator.

The following advantages are achieved with the invention:

The compressor is efficiently cooled, which also leads to higher compressor efficiency and heat factor.

The advantages of employing a lubricant as component in the refrigerant, is that the refrigerant will be non-corrosive.

Vibrations and lubricator splashing will agitate the refrigerant, which in its turn will render the desorption in the desorbator more efficient.

The heat pump may be manufactured in an efficient way since all component parts are integrated inside the same housing (pressure vessel).

Insulation of the heat pump will be simple thereby minimizing heat losses.

Preliminary calculations show that a heat factor of 2.6–3.5 is achievable for a system of this type at the same conditions of operation as a system of ordinary construction as discussed above, which yields a heat factor of 2–2.5.

The invention will now be described in terms of preferred embodiments thereof, with reference to the attached drawing Figures.

DETAILED DESCRIPTION OF PREFERRED EMBODIMENTS

Figure 1:
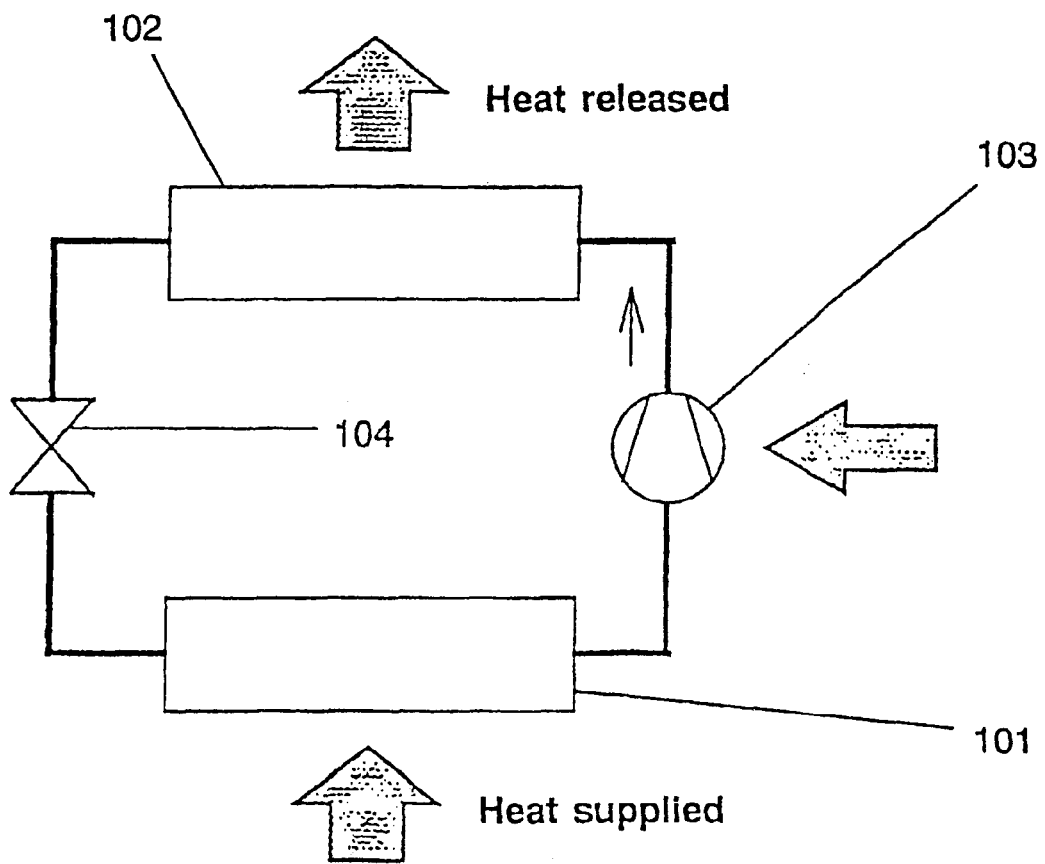
FIG. 1 illustrates a prior art heat pump system.

In the following description of various embodiments of the invention, like elements are denoted with the same reference numerals.

FIG. 1 illustrates a conventional heat pump comprising an evaporator 101 and a condenser 102, a compressor 103 pumping vapor at low temperature and low pressure to a higher pressure and temperature where heat is released, and an expansion valve 104 for returning the liquid to the evaporator.

Figure 2:
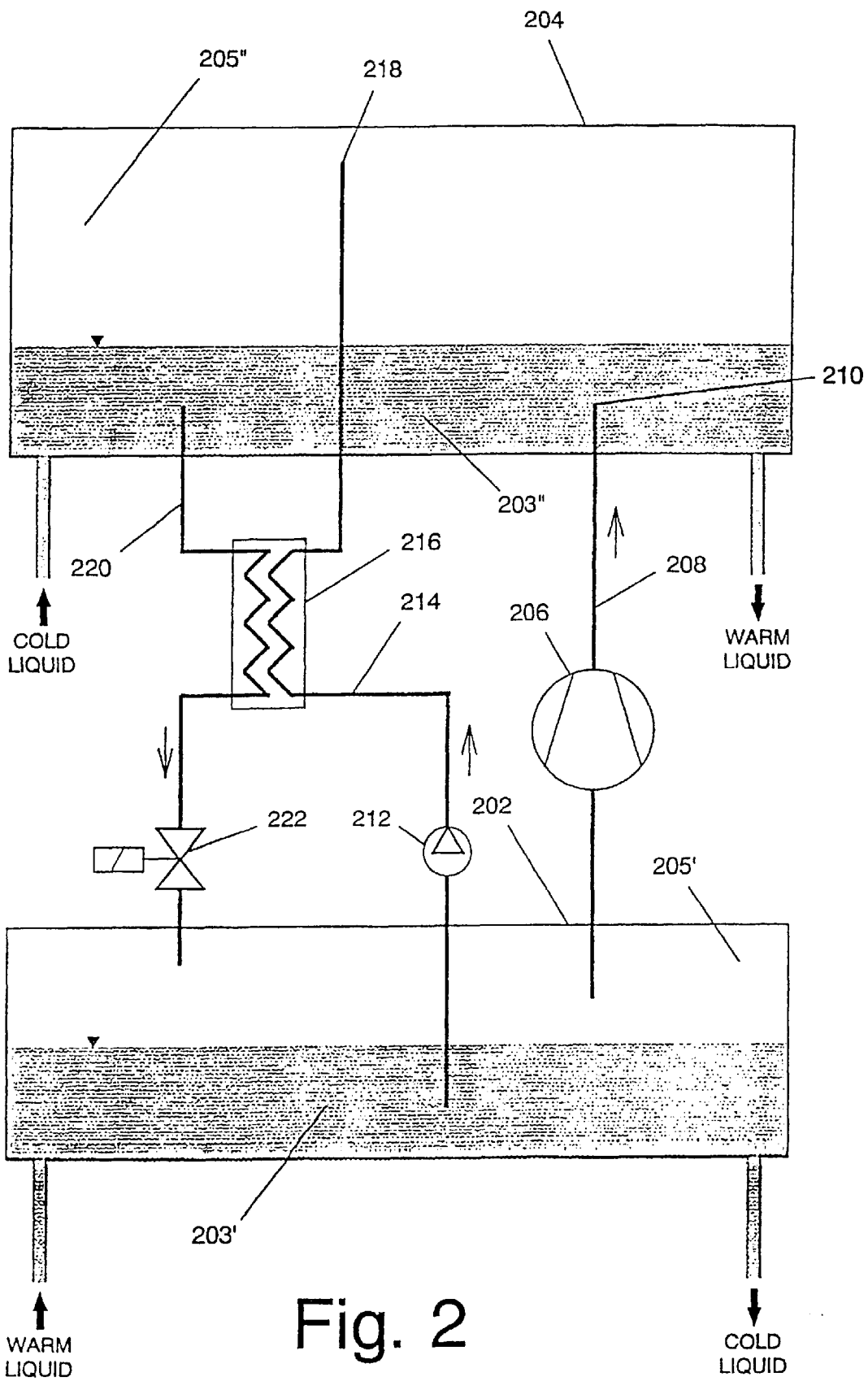
FIG. 2 illustrates a heat pump operating according to the absorbator-desorbator principle.

FIG. 2 illustrates a heat pump system using a two component refrigerant. It comprises a desorbator 202, an absorbator 204, a compressor 206, connecting the desorbator 202 and the absorbator 204 via pipe 208. Inside the absorbator the pipe terminates in the gas outlet 210, which is located in the liquid phase 203". The system further comprises a liquid pump 212, pumping the liquid 203' from the desorbator 202 through a pipe 214 passing through a countercurrent heat exchanger 216 and ejecting the liquid in the gas phase 205" of the absorbator 204 through an outlet 218. This transport of liquid is necessary in order to balance the relative concentrations in the liquid 203" and gaseous phases 205" respectively, inside the absorbator 204.

A return pipe 220 passes liquid 203" from the absorbator 204 through said countercurrent heat exchanger 216 via a restriction means 222 and an outlet means 224 into the gas phase 205' of the desorbator 202.

As indicated with arrows, warm liquid is withdrawn from the absorbator for heating purposes, and cold liquid from the environment to be heated is introduced into the absorbator.

Similarly, liquid warmed up by the heat source is introduced into the desorbator, and cold liquid is returned to the heat source from the desorbator.

Figure 3:
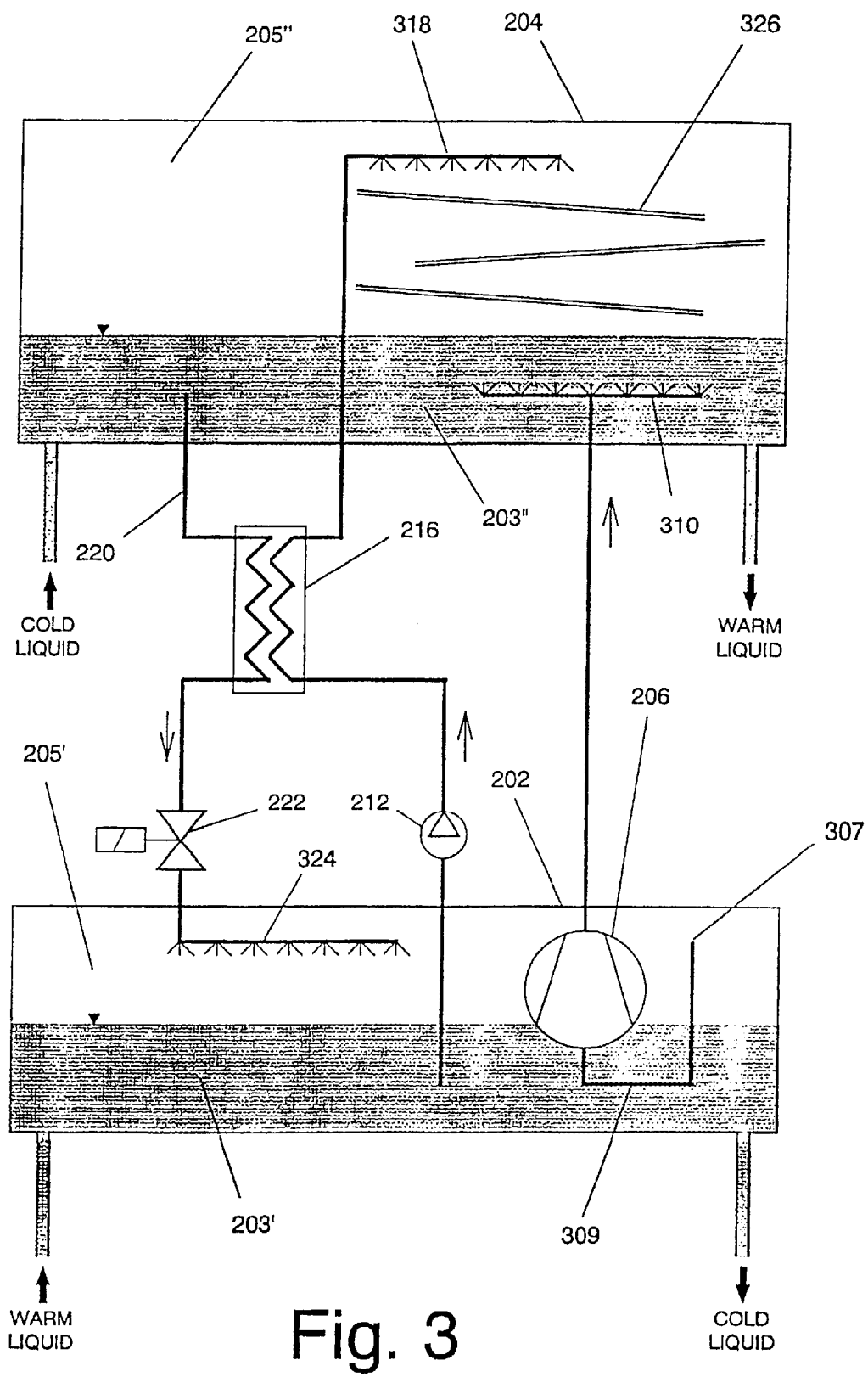
FIG. 3 illustrates one embodiment of the heat pump system according to the invention.

Turning now to FIG. 3, an embodiment of the heat pump according to the invention is shown.

Components common to the device shown in FIG. 2 are denoted with the same reference numerals.

The apparatus according to the invention comprises the same five main components as the apparatus of FIG. 2, namely a desorbator 202, an absorbator 204, a countercurrent heat exchanger 216, a compressor 206, and a restriction valve 222, e.g. a magnetic valve, a rotary valve of solenoid type or the like. The major constructive difference, in relation to prior art as disclosed in FIG. 2, is that the compressor 206 is located inside the desorbator 202. In such a case provisions must be made such that compressor inlet 307 is maintained in the gas phase 205' via suitable piping 309.

In accordance with the invention, preferably there are provided nozzle means 318, disposed to distribute the liquid pumped from the desorbator liquid phase over a relatively large surface, and in order to further improve the absorption process, there are provided surface enlargement means 326 below the nozzles 318. These surface enlargement means comprise sheets of metal on which the liquid will spread out and thereby exposing a larger surface, thereby enhancing absorption. Alternatively there could be provided metal mesh members on which the droplets fall and disintegrate into still smaller drops, thereby still further enhancing the absorption process.

There are also provided gas nozzle means 310 provided at the gas outlet inside the liquid phase in the absorbator for promoting the absorption process. The nozzle means 310 generates a large number of small bubble, thereby increasing the active surface for absorption.

A similar nozzle means 324 is provided in the desorbator for promoting desorption therein.

The refrigerant is a two-component gas/liquid composition, wherein the liquid component acts as a lubricant. The presently used and preferred liquid component is diesel fuel. A typical diesel fuel is obtainable from Svenska Statoil AB, Stockholm, Sweden, and comprises hydrocarbons in the boiling point range 180° C.–300° C., which corresponds to $C_9$–$C_{17}$ carbon chains, 4% (by volume) of aromatic hydrocarbons and <0.02% (by volume) of polycyclic aromatics. The viscosity of this diesel fuel is 2.0 mm$^2$/s at 40° C. This diesel fuel also contains an additive rendering the fuel still more lubricious. The additive may be long chain polyalcohols, alkylaminoesters, aliphatic naphtha, or similar compounds rendering the liquid hydrocarbons more lubricious.

However, other types of liquid component of the two-component refrigerant are contemplated, and examples of suitable liquid components are lubricating oils with low viscosity, e.g. CompWay™ 68, obtainable from Svenska Statoil AB, Stockholm, Sweden. It has a viscosity of 62.2 mm$^2$/s at 40° C., and 8.9 mm$^2$/s at 100° C. Other oils from the same manufacturer that are usable are, Synesstic™, FridgeWay™, and Zerice™.

Synthetic lubricants such as those based on polyalphaolefins, polyglycols, silicone oils and synthetic esters are also conceivable.

Suitably the viscosity of an appropriate liquid should be 1–40 mm$^2$/s, preferably 1.5–20 mm$^2$/s, or more preferably 2–10 mm$^2$/s, at 40° C.

The gaseous component could be e.g. liquefied petroleum gas, basically propane. Shell Premium Propane (obtainable from Shell Corp.) comprises 96% (by weight) propane ($C_3H_8$), pentanes and higher O %, and olefins $C_nH_{2n}$<0.5%.

Other possible gases are hydrocarbons with 1–5 carbon atoms such as iso-butane, and ethers, e.g. ethyl ether.

In summary, the important characteristics of the refrigerant is that it shall comprise a liquid having lubricating properties, and having the capability of absorbing a gaseous component.

Because the compressor 206 is partially immersed, as shown in FIG. 3, an efficient lubrication of it will take place.

In particular the lubrication may be provided for by letting the shaft of the compressor extend down into the liquid, and being enclosed inside a tube. The extended shaft portion is designed as a screw conveyor, and thus the liquid will be transported upwards by the rotational movement of the screw shaft up to the top of the compressor, where lubricant will be splashed over the moving parts. This is conventional technology and well known to the skilled man, and does not form a part of the invention as such.

Thus, in the embodiment of the heat pump system according to the present invention shown in FIG. 3, only the compressor 206, is integrated in the desorbator. The liquid pump 212 and the restriction valve 222 on the other hand are located externally of the desorbator.

Figure 4:
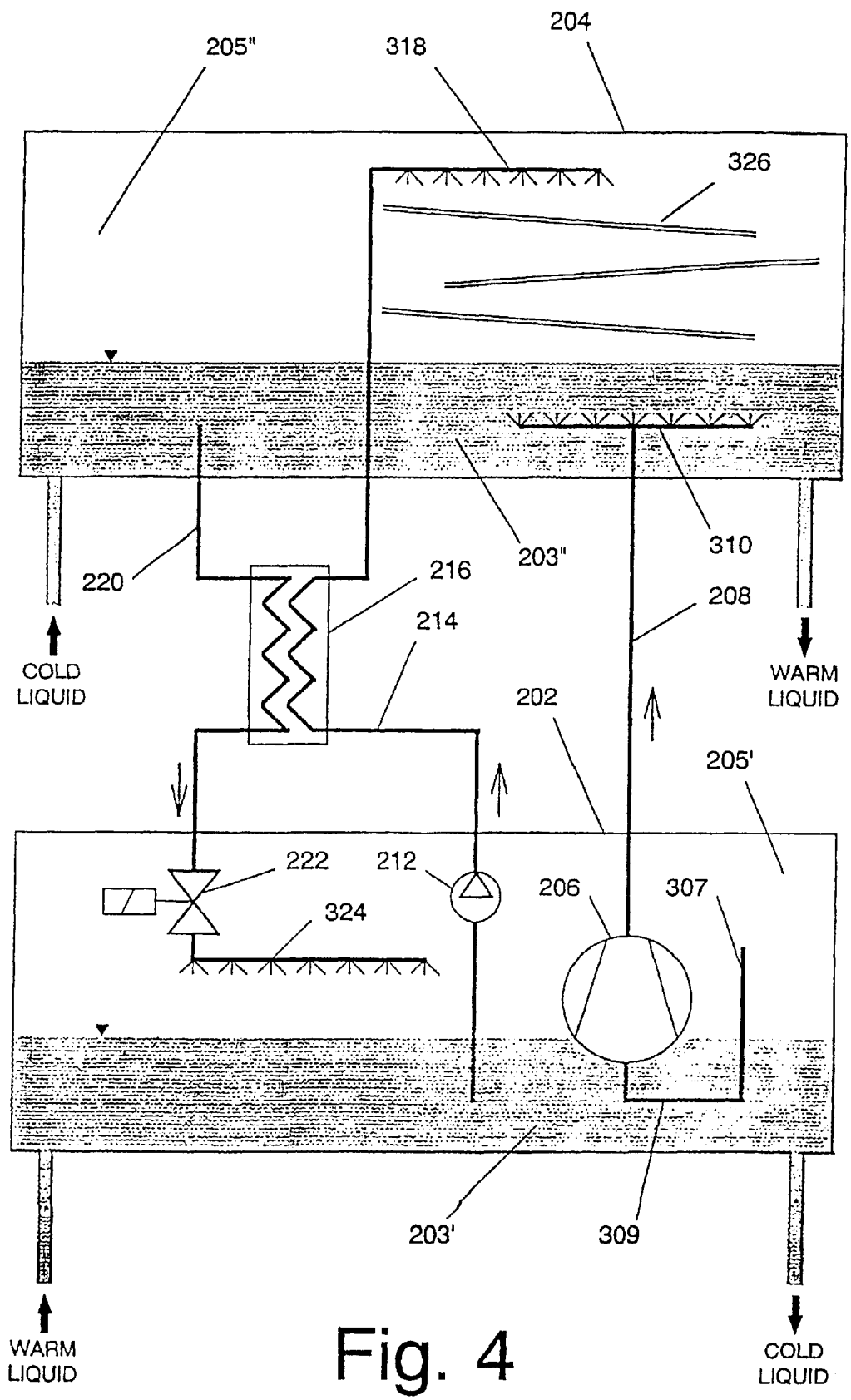
FIG. 4 illustrates a preferred embodiment of the heat pump system according to the invention.

It is, however, preferred and within the inventive concept to integrate all these components in the desorbator. This will achieve the object of the invention in still more efficient way, namely to increase the efficiency compared to prior art heat pumps. An embodiment wherein all moving parts, i.e. the compressor, the liquid pump and the restriction means are integrated in the desorbator is illustrated in FIG. 4.

Thus, in this embodiment, also the liquid pump 212 and the restriction valve 222 are located inside the desorbator. The liquid pump 212 and the compressor 206 are at least partially, but may be substantially entirely immersed in the liquid phase 203' inside the desorbator 202. Also here, provisions must be made such that compressor inlet 307 is maintained in the gas phase 205' via suitable piping 309.

The function of the heat pump according to the invention will be described in closer detail with reference to the embodiment disclosed in FIG. 4.

A compressor 206 is shown partially immersed in the liquid phase 203' of the desorbator 202. The compressor passes gas 205' from the desorbator 202 via a pipe 208 into the liquid phase 203" in the absorbator 204. The gas is distributed in the liquid phase 203" via a nozzle means 310, designed in the same way as the gas outlet means described in connection with FIG. 2. The liquid pump 212 pumps liquid through a heat exchanger 216 into the absorbator 204. The liquid phase 203" in the absorbator 204 is passed via suitable piping 220 through said heat exchanger and the restriction valve 222 and back into the gas phase 205' of the desorbator 202. The gas phase 205' in the desorbator is pumped through the compressor 206 and into the liquid phase 203" of the absorbator where the gas is absorbed by the liquid, and whereby heat of condensation of the gas and its chemical heat of binding is released. In order that the process be maintained in a continuous operation, gas liberated inside the desorbator is pumped by the compressor 206 into the absorbator as mentioned above. The return flow of enriched liquid from the absorbator to the desorbator is driven by the pressure difference between absorbator and desorbator. This flow is regulated by the restriction device 222, which suitably may be of a magnetic valve type. The function of the heat exchanger 216 is to thermodynamically isolate the absorbator and the desorbator from each other, that is, there is no net transport of heat between the absorbator and the desorbator.

Figure 5:
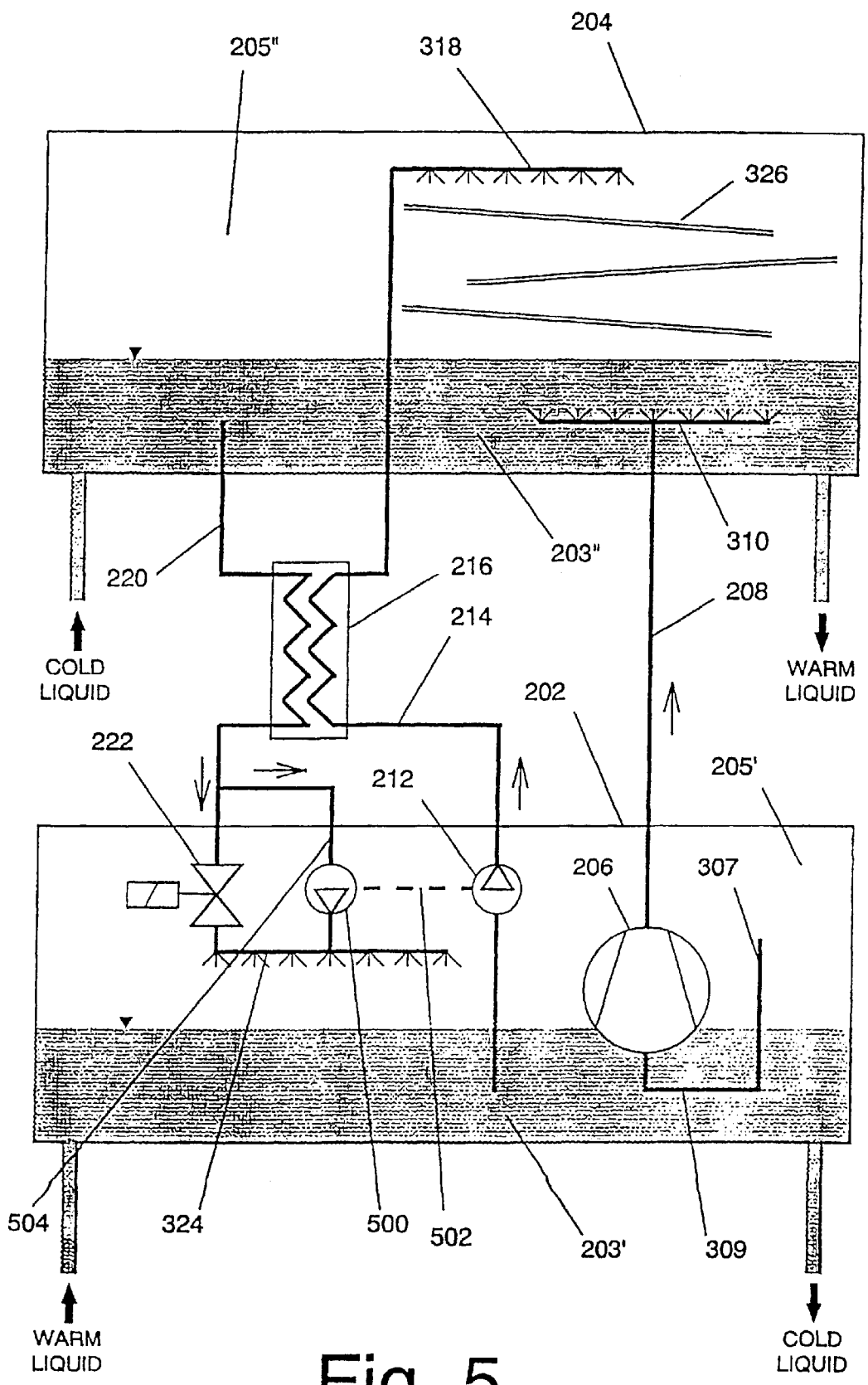
FIG. 5 illustrates a further embodiment of the invention.

In a particular embodiment shown in FIG. 5, which is a further development of the embodiment of FIG. 4 (all components are denoted with the same reference numerals to the extent they are equal to those of FIG. 4), there is provided a hydraulic motor 500, preferably mounted on and driven by the same shaft 502 as the main liquid pump 212. The hydraulic motor 500 passes liquid in a conduit 504 by-passing the restriction valve 222. Because the liquid flow from the absorbator is driven by the pressure differential between absorbator/desorbator, the hydraulic 500 motor will supply work to the pump 212, thereby further increasing the efficiency of the system as a whole. In this embodiment the restriction valve 222 is used mainly as a moderating means for leveling out variations in the various mass flows in the system.

With the heat pump according to the invention, by using a lubricant as refrigerant, lubrication of the moving parts becomes simple. This means that simpler components may be used in the equipment. In particular if the compressor and pumps are integrated inside the desorbator, the need for pressure proof lead-throughs for drive shafts will be eliminated. Also, the refrigerant-lubricant is inherently non-corrosive, in contrast to other refrigerant systems such as ammonia-water, and thus electrical motors and other metal components will not deteriorate because of the environment in which they are operated.

Also the cooling of the moving parts will be very efficient, since the temperature by definition is low inside the desorbator, thereby the risk of coking of the lubricant is eliminated, a problem that occurs frequently with e.g. compressors operating in ambient conditions where adequate cooling may be difficult to achieve.

The desorbator must of course be connected to some kind of source for the heat to be pumped. In this regard any conventional source is usable, such as outdoor air, ground heat, sea or lake water, rock in bore holes etc. The skilled man will be able to implement the invention with any suitable source without inventive work.

The heat pump may be mounted as two separate units on a house for domestic heating. Thus, the desorbator may be mounted on the outside and the absorbator may be mounted inside the house, for optimum performance.

Figure 6:
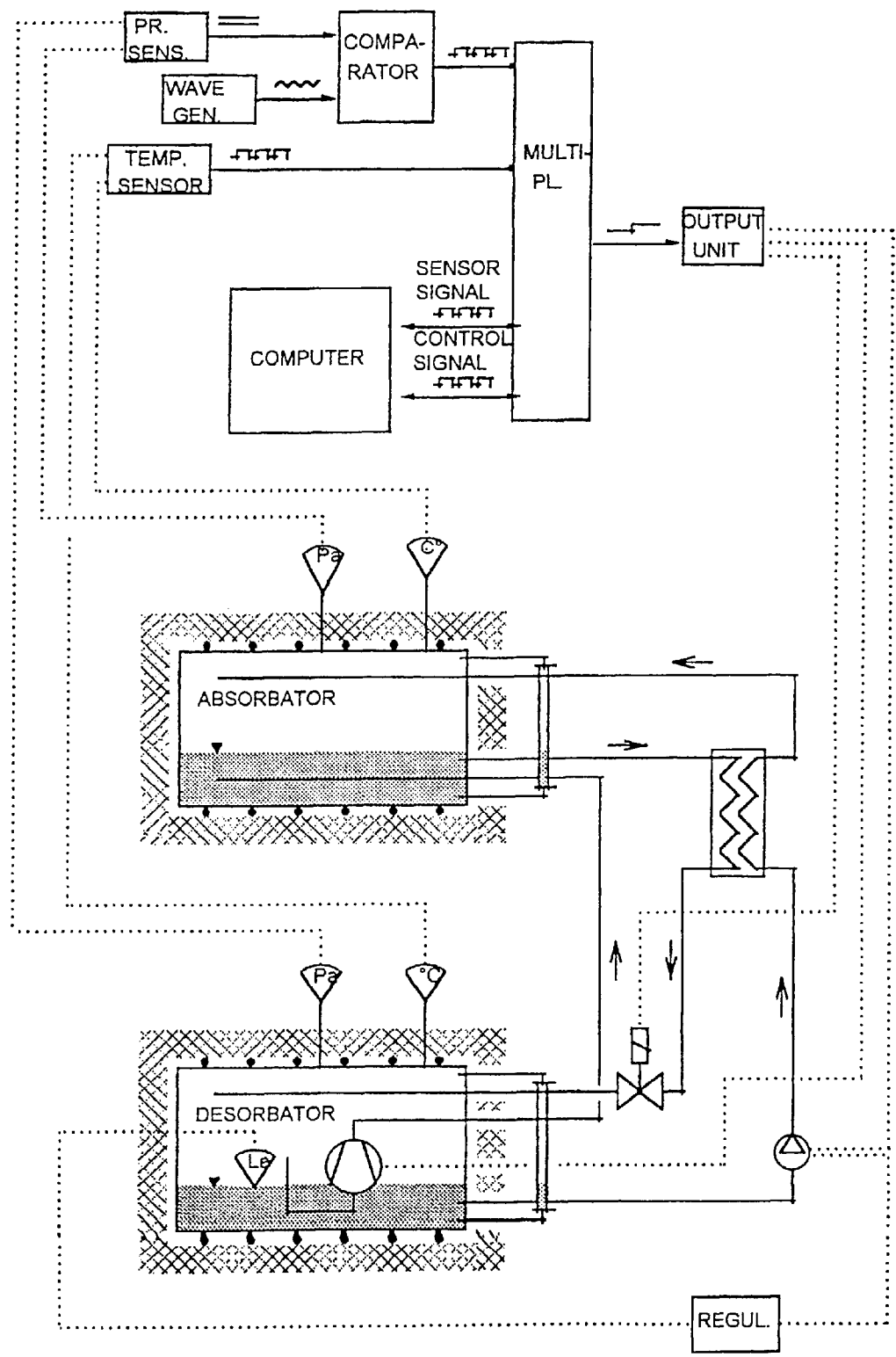
FIG. 6 is a schematic illustration of the control system for operating the heat pump system according to the invention.

FIG. 6 illustrates a control system suitable for operating the heat pump according to the invention.

It comprises a TEMPERATURE SENSOR and a PRESSURE SENSOR ("Pa" and "C°" respectively) in each of the desorbator and the absorbator respectively, for continuous monitoring of the system status. The signals from said pressure sensors are supplied to a COMPARATOR unit which is also connected to a WAVE GENERATOR, feeding a saw-tooth wave to the COMPARATOR. The output of the COMPARATOR is a digital signal suitable for processing in a COMPUTER.

The signals from each TEMPERATURE SENSOR and the output from the COMPARATOR are supplied to a MULTIPLEXER which feeds the COMPUTER for processing. In response to the input temperature and pressure data the COMPUTER issues appropriate commands that via the MULTIPLEXER and an OUTPUT UNIT, control the operation of the compressor, pump and restrictor respectively.

The heat factor is dependent of both absorbator and desorbator temperatures and by the heat released by the heat pump. This means that for an optimized heat factor there is a corresponding optimized liquid flow. The computer calculates this optimized liquid flow with input from TEMPERATURE and PRESSURE SENSORS. As the pressure difference between the absorbator and the desorbator is known, the COMPUTER then calculates the setting of the restriction.

To keep the system in balance the pump capacity is regulated, in terms of speed variations, to keep the liquid level in the desorbator constant. In the desorbator there is provided a level indicator ("Le"), the output of which is the basis of the operation of a REGULATOR for said speed variations.

When the heat pump is shut down, the COMPUTER issues commands to close the restriction, and to turn off the compressor and the pump.

The invention will now be further illustrated by the following non-limiting Examples.

EXAMPLES

An experimental set-up comprising the components indicated below was used to verify the function of the heat pump system according to the invention (see EXAMPLE 2 below).

The set-up comprises an absorbator made of steel and having the following dimensions:

| Width | 305 mm |
|---|---|
| Height | 405 mm |
| Length | 980 mm |
| Weight | 70 kg (including heater, but excluding refrigerant, insulation and sensors) |
| Volume | 0.121 m³ |

A heater for controllably heating the vessel is provided. The cold resistance of the heater is 82.9 Ohms.

The desorbator in the set up is also made of steel and has following dimensions:

| Width | 305 mm |
|---|---|
| Height | 405 mm |
| Length | 780 mm |

| Weight | 62.5 kg (including heater, but excluding refrigerant, insulation and sensors) |
|---|---|
| Volume | 0.096 m³ |

Also the desorbator is provided with a heater for controllably heating the vessel. The cold resistance of the heater is 81.8 Ohms.

The compressor is a ZEM HE 80 101 S from Zanussi. The liquid pump is a Fluid-O-Tech P0 301. The heat exchanger is a SWEP Type B25.

The two component refrigerant comprises as the lubricant liquid diesel fuel (STATOIL Diesel class 1). The total mass of the liquid is 15 kg, i.e. 0.0184 m³ at 15° C. The gaseous component is a mixture of 2.5 kg iso-butane, class 2.5, and 2 kg liquefied petroleum gas (Propane 95 from Statoil, Sweden).

EXAMPLE 1

This example is a theoretical evaluation of an absorption-compression based heat pump system according to the invention compared to a conventional heat pump based on evaporation-compression.

In this example let us assume a conventional heat pump adapted to transport heat from −35° C. ambient to 55° C. ambient. This pump is represented by table 1.

TABLE 1

Compressor: Danfoss SC21B    Condensing temperature: 55° C.

| Evap. temp. [° C.] | Evap. pr. [kPa] | Cond. pr. [kPa] | Pr. diff. [kPa] | Input [W] | Capacity [W] | Heat. of evap. [kJ/kG] | Mass flow [kg/s] |
|---|---|---|---|---|---|---|---|
| −40 | 63,53 | 1357 | 1293,47 | 320 | 160 | 166,7 | 9,60E-04 |
| −35 | 79,74 | 1357 | 1277,26 | 390 | 230 | 164,9 | 1,39E-03 |
| −30 | 99,04 | 1357 | 1257,96 | 460 | 325 | 162,9 | 2,00E-03 |
| −25 | 121,8 | 1357 | 1235,2 | 525 | 425 | 160,9 | 2,64E-03 |
| −20 | 148,6 | 1357 | 1208,4 | 590 | 540 | 158,9 | 3,40E-03 |
| −15 | 179,6 | 1357 | 1177,4 | 650 | 670 | 156,7 | 4,28E-03 |
| −10 | 215,5 | 1357 | 1141,5 | 705 | 855 | 154,5 | 5,53E-03 |
| −5 | 256,7 | 1357 | 1100,3 | 760 | 1035 | 152,2 | 6,80E-03 |
| 0 | 303,6 | 1357 | 1053,4 | 805 | 1250 | 149,8 | 8,34E-03 |
| 5 | 356,8 | 1357 | 1000,2 | 850 | 1485 | 147,3 | 1,01E-02 |
| 10 | 416,8 | 1357 | 940,2 | 880 | 1775 | 144,6 | 1,23E-02 |
| 15 | 484,1 | 1357 | 872,9 | 910 | 2130 | 142 | 1,50E-02 |

Table 1 is an extract from a data sheet for a real refrigeration compressor, Danfoss SC21C, with a cylinder volume of 21 cm³. The extracted data used for calculation is shown in the vertical boxes. The horizontal box represent the assumed running condition. In this conventional heat pump system the pressure difference over the compressor is a function of refrigerant only, and cannot be affected.

If this pump is replaced by an absorption-compression system according to the invention, the pressure difference over the compressor can be easily influenced and reduced. This will have the effect on the SC21 compressor that it will be much more efficient and can be replaced by a much smaller one with no loss in mass flow and capacity. This is represented by table 2 which contains data for a Danfoss FR8, 5B compressor with cylinder volume 8.5 cm³.

TABLE 2

Compressor: Danfoss FR8,5B         Condensing temperature: 55° C.

| Evap. temp. [° C.] | Evap. pr. [kPa] | Cond. pr. [kPa] | Pr. diff. [kPa] | Input [W] | Capacity [W] | Heat. of evap. [kJ/kg] | Mass flow [kg/s] |
|---|---|---|---|---|---|---|---|
| -40 | 63,53 | 1357 | 1293,47 | 105 | 48 | 166,7 | 2,88E-04 |
| -35 | 79,74 | 1357 | 1277,26 | 125 | 72 | 164,9 | 4,37E-04 |
| -30 | 99,04 | 1357 | 1257,96 | 150 | 106 | 162,9 | 6,51E-04 |
| -25 | 121,8 | 1357 | 1235,2 | 170 | 145 | 160,9 | 9,01E-04 |
| -20 | 148,6 | 1357 | 1208,4 | 195 | 187 | 158,9 | 1,18E-03 |
| -15 | 179,6 | 1357 | 1177,4 | 220 | 240 | 156,7 | 1,53E-03 |
| -10 | 215,5 | 1357 | 1141,5 | 245 | 300 | 154,5 | 1,94E-03 |
| -5 | 256,7 | 1357 | 1100,3 | 270 | 375 | 152,2 | 2,46E-03 |
| 0 | 303,6 | 1357 | 1053,4 | 300 | 460 | 149,8 | 3,07E-03 |
| 5 | 356,8 | 1357 | 1000,2 | 325 | 555 | 147,3 | 3,77E-03 |
| 10 | 416,8 | 1357 | 940,2 | 355 | 660 | 144,6 | 4,56E-03 |
| 15 | 484,1 | 1357 | 872,9 | 385 | 770 | 142 | 5,42E-03 |

The horizontal box contains running data for almost the same massflow and capacity as for the conventional system.

The heat factor, $\Phi_1$, for the conventional system may be written as $$\Phi_1 = (P_{input} + P_{cap})/P_{input}$$

wherein $P_{input}$ is the electrical input needed for operating the compressor at specified condensation and evaporation temperatures $P_{cap}$ is the cooling capacity for the compressor at specified condensation and evaporation temperatures which gives:

$$\Phi_1 = (390(input) + 230(capacity))/390(input) = 1.59$$

The heat factor $\Phi_2$, for the absorption-compression system:

$$\Phi_2 (220(input) + 240(capacity) + 35)/(220(input) + 35) = 1.94$$

The term 35 (W) is the input power necessary for circulating the fluid. This input is actually only a few watts but with mechanical and electrical losses this input is assumed to be 35 watts (thus, probably an overestimate).

$$(\Phi_2 - \Phi_1)/\Phi_1 = (1.94 - 1.59)/1.59 = 0.23$$

The necessary reduction in pressure difference is calculated to be:

$$(1177.4(kPa) - 1277.26(kPa))/1277.26(kPa) = -0.08$$

Conclusion: The heat factor is increased by 22% with a decrease in pressure difference of 8%.

Tests shows that a practical obtainable decrease in pressure difference is about 50%, indicating an obtainable increase in the heat factor $\Phi$ of about 30%, compared to conventional systems.

The following Example will show that a 50% reduction in pressure difference is obtainable with an absorption-compression system according to the present invention.

EXAMPLE 2

Figure 7:
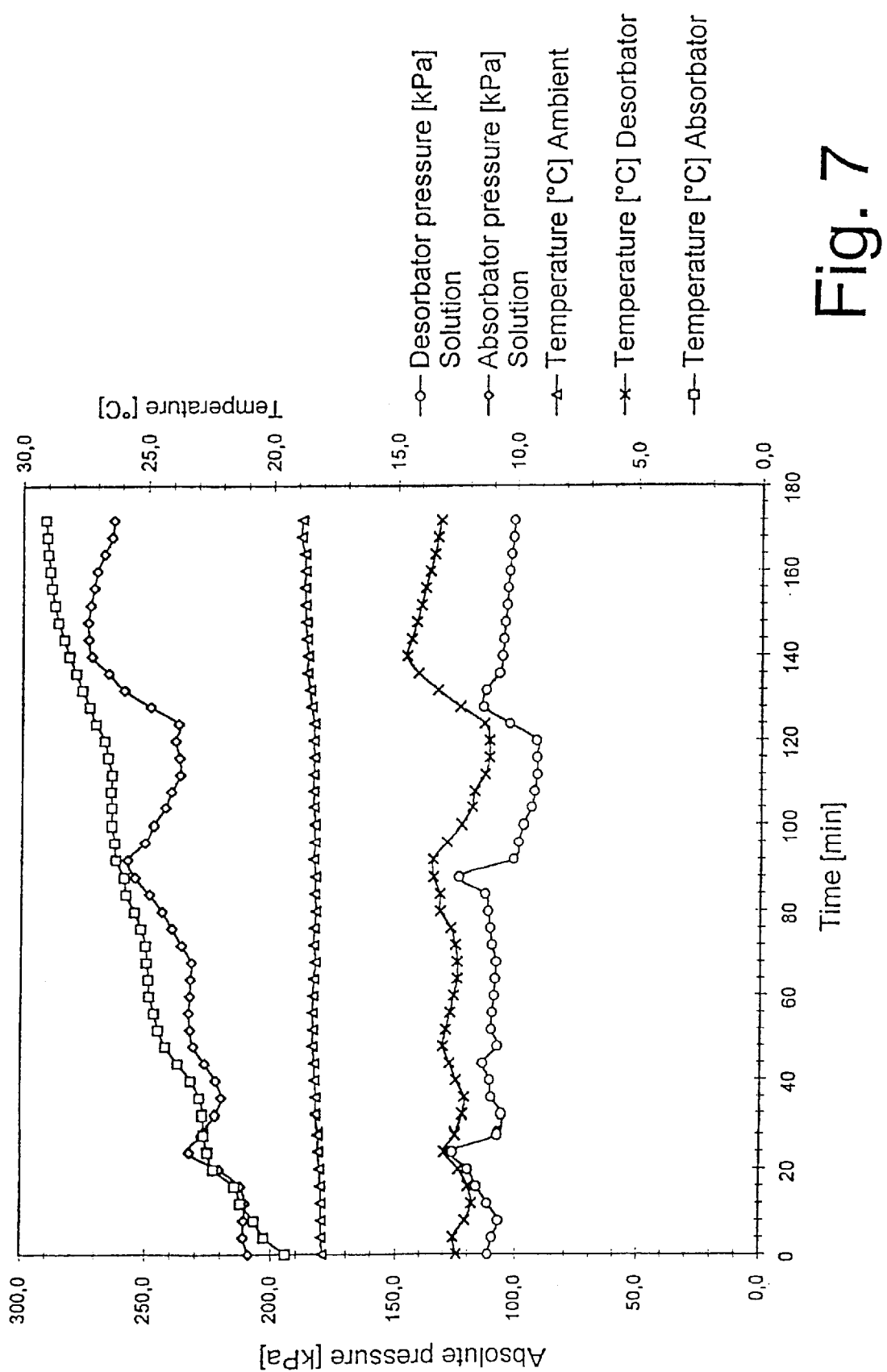
FIG. 7 shows a test run with an apparatus according to the invention.

The diagram shown in FIG. 7 shows a test run with a refrigerant solution comprising a mixture of propane/isobutane dissolved in diesel fuel.

In this diagram all parameters that were measured are shown. These are ambient-, absorbator- and desorbator temperatures and absorbator- and desorbator pressure.

Figure 8:
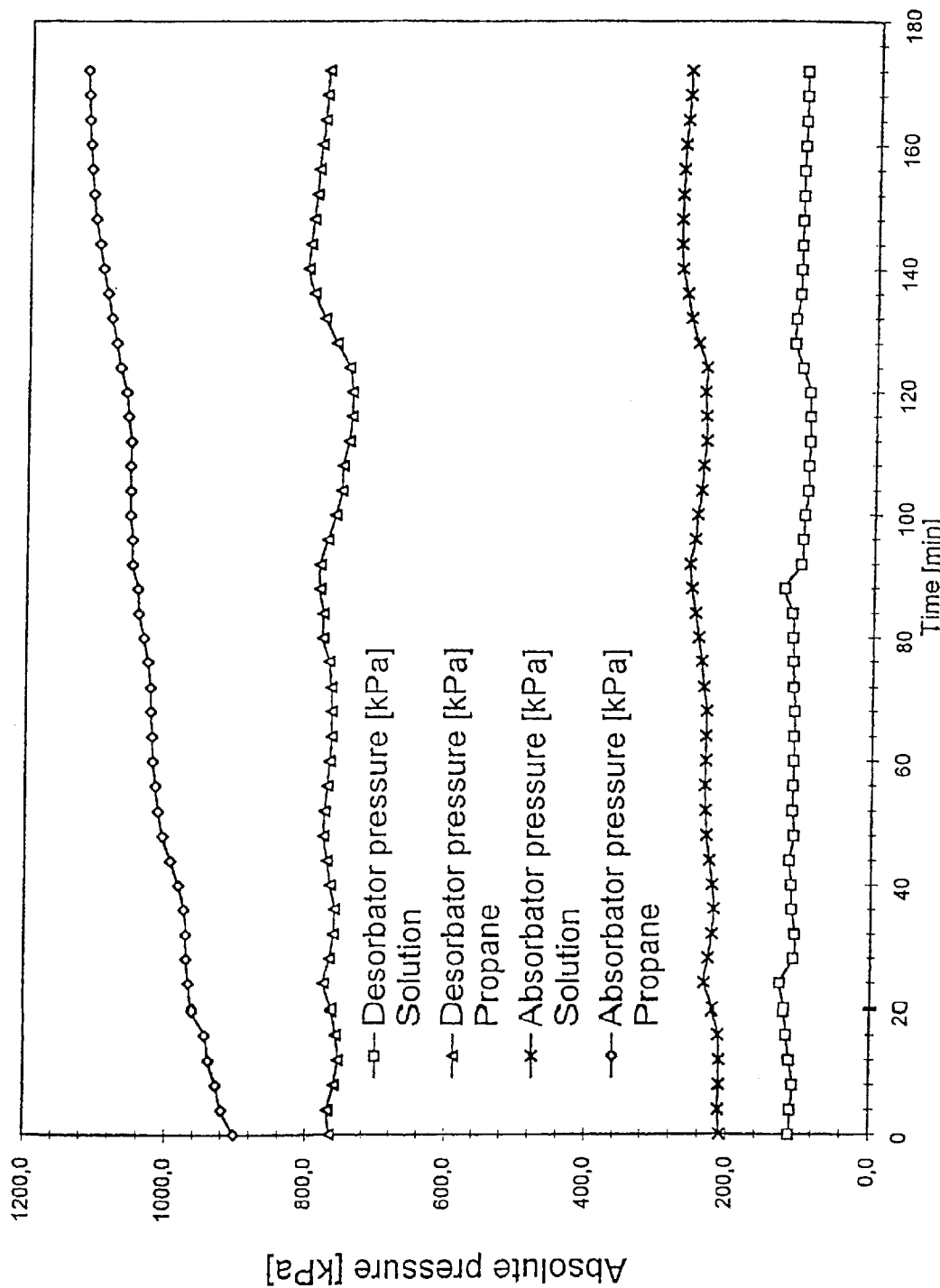
FIG. 8 is a graph showing pressure and temperature in the absorbator and desorbator vs time.

If the refrigerant was pure propane the absorbator and the desorbator pressures should be a function of the absorbator and the desorbator temperatures, respectively. These corresponding pure propane pressures are calculated from the vapor pressure equation and the result is shown in the diagram in FIG. 8.

Figure 9:
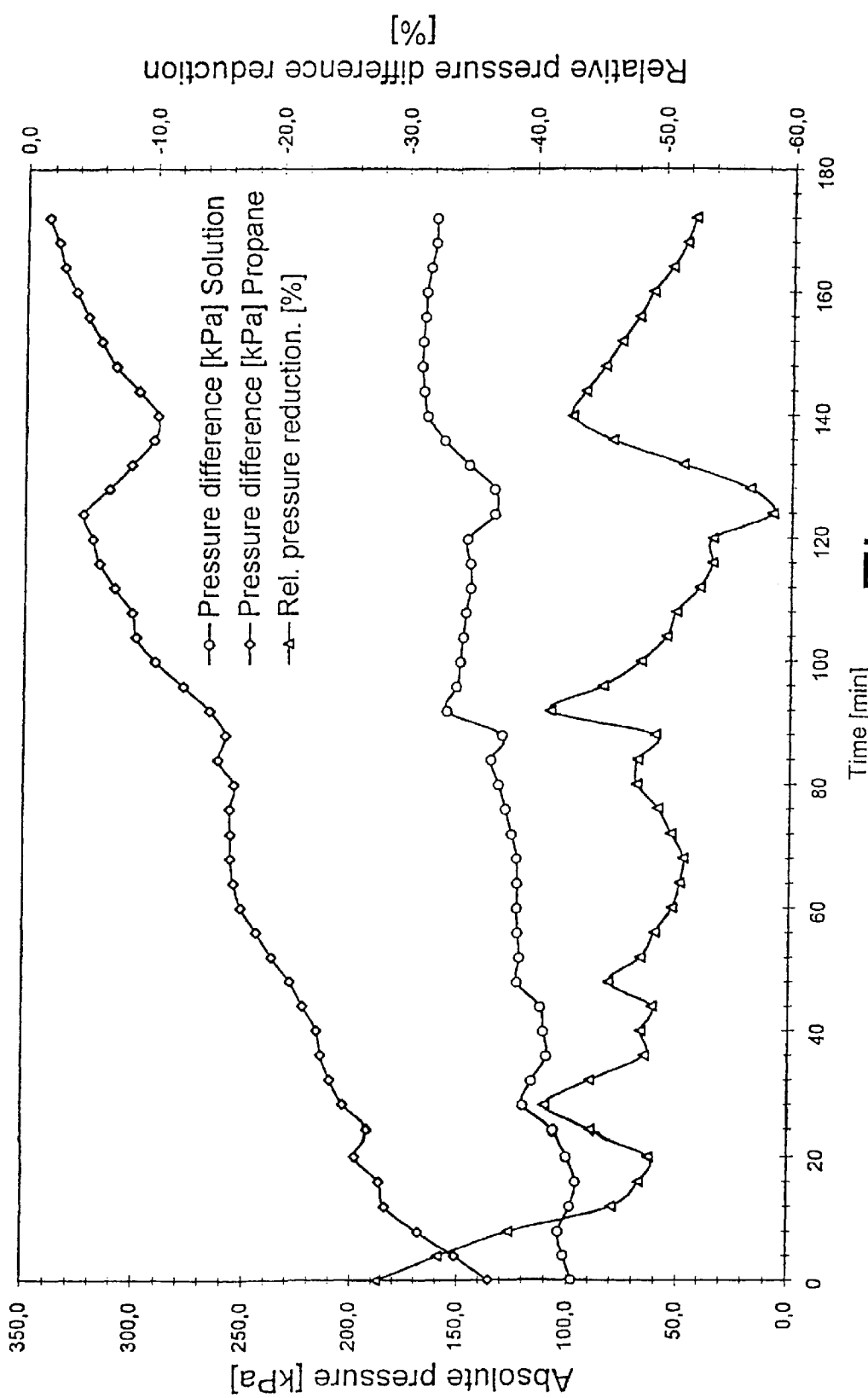
FIG. 9 is a graph showing the calculated reduction in pressure over compressor.

As a result of this calculation, it is easy to calculate both pressure differences and of course the relative pressure difference, see diagram in FIG. 9 (calculation performed as in EXAMPLE 1).

As is clearly shown in FIG. 9, the average pressure reduction is about 50%.

In this test the liquid flow was (mean value) $2.5 - 10^{-5}$ m$^3$/s. The power necessary to drive the liquid flow was 4 W. Assuming an efficiency for both the pump and the motor of 40%, this is equivalent to an electrical input of 25 W for driving the pump.

Although the invention has been described in terms of embodiments of a heat pump system, suitable for domestic heating purposes, it should be understood that it is equally possible to operate the apparatus in reverse mode, i.e. as a cooling system, such as for air conditioning purposes. The adaptation to such use is simple and forms per se no part of the invention, however of course the cooling aspect is within the scope of the inventive concept.

Figure 10:
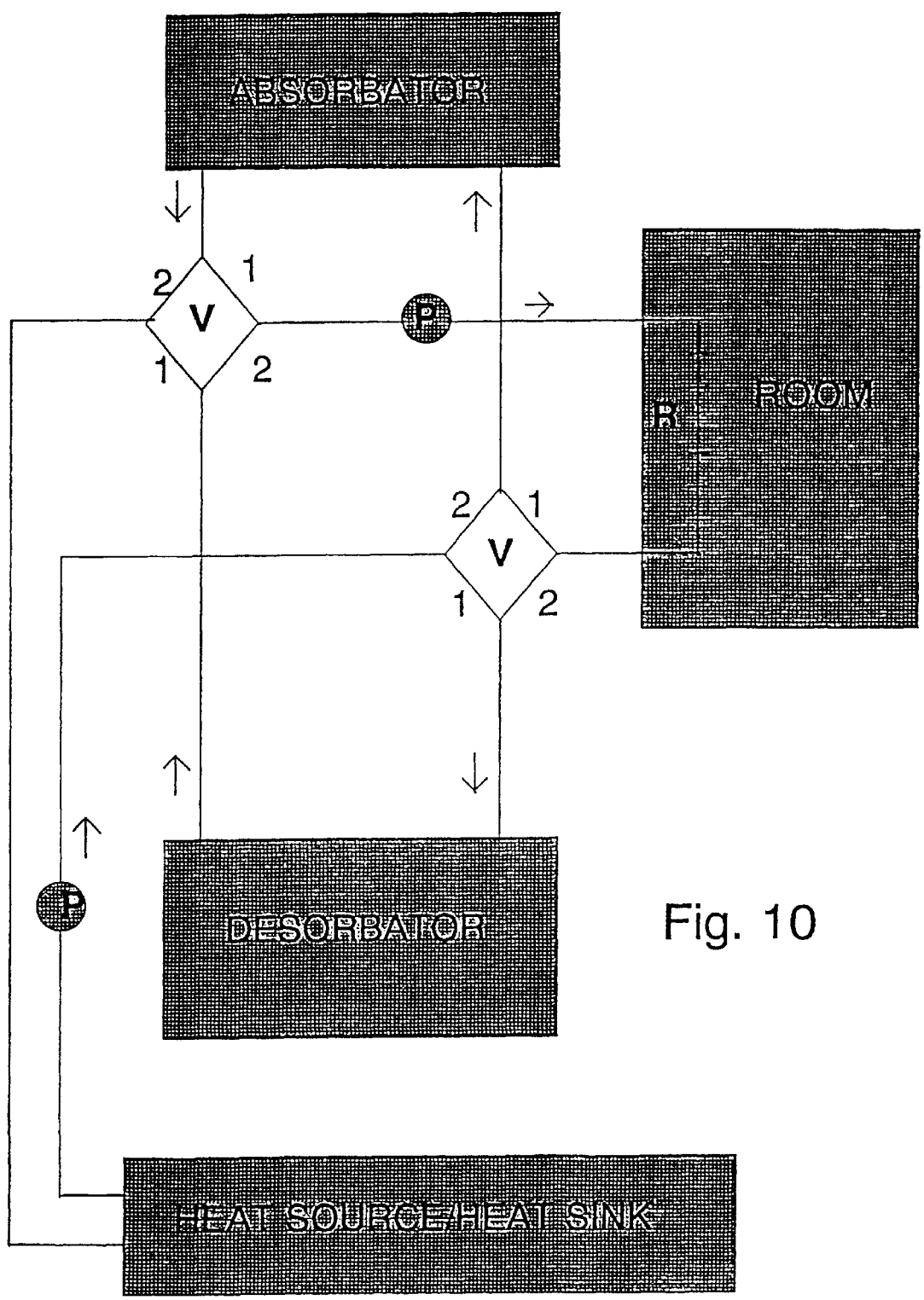
FIG. 10 illustrates a combination mode apparatus of the invention.

It is also possible to construct a combination system which is operable in both cooling and heating mode, as described. This requires valving means for switching the various flows of refrigerant as shown in FIG. 10. Thus, in heat pump mode the 4-way switch valves V are set to direct the flow, pumped by pumps P, along the path identified by 1, whereby path 2 is closed. Thereby heat is delivered in the radiator R to heat up the room. In cooling mode the valves are set to direct fluid along path 2, whereby the radiator acts as a heat source removing heat, thus cooling the room.

Many variations and modifications of the disclosed invention are conceivable, and the invention shall only be limited by the scope of the appende claims.

What is claimed is:

1. A heat transport apparatus, comprising an absorbator (204), a desorbator (202), a compressor (206), a liquid pump (212), a heat exchanger (216), a restriction means (122) and a two-component gas/liquid refrigerant, wherein the compressor (206) is integrated within the desorbator (202), and the refrigerant comprises a lubricant.

2. The heat transport apparatus as claimed in claim 1, wherein the refrigerant comprises a gas absorbed in the liquid.

3. The heat transport apparatus as claimed in claim 2, wherein said liquid component comprises compounds selected from the group of compounds consisting of hydrocarbons having $C_9$–$C_{17}$ carbon chains, hydrocarbons having a boiling point in the range 180° C.–300° C., lubricating oils with low viscosity, polyalphaolefins, polyglycols, silicone oils and synthetic esters, long chain polyalcohols, alkylaminoesters, aliphatic naphtha or mixtures thereof.

4. The heat transport apparatus as claimed in claim 3, wherein the lubricant comprises diesel fuel.

5. The heat transport apparatus as claimed in claim 3, wherein said hydrocarbon comprises iso-butane or liquefied petroleum gas.

6. The heat transport apparatus as claimed in claim 2, wherein the gaseous component is selected from the group consisting of a hydrocarbon, an ether, or mixtures thereof.

7. The heat transport apparatus as claimed in claim 2, wherein said ether is ethyl ether.

8. The heat transport apparatus as claimed in claim 1, wherein the restricting means (122) and the pump (112) are integrated in the desorbator (202).

9. The heat transport apparatus as claimed in claim 1, further comprising a hydraulic motor (500) connected to the shaft (502) of the liquid pump (212), and arranged to conduct liquid from the absorbator via a conduit (504), bypassing said restriction means (222).

10. The heat transport apparatus as claimed in claim 1, comprising surface enlargement means (326) provided inside the absorbator (204).

11. The heat transport apparatus as claimed in claim 1, wherein the one of the absorbator and the desorbator is mounted inside a building, and the other is mounted on the outside of said building.

12. The heat transport apparatus of claim 1, wherein said apparatus comprises a heat pump.

13. The heat transport apparatus of claim 1, wherein said apparatus comprises a cooling apparatus.

14. The heat transport apparatus as claimed in claim 1, further comprising means for switching between a heating and a cooling mode of operation.

15. The heat transport apparatus as claimed in claim 1, wherein the compressor is at least partially immersed in the refrigerant.

16. The heat transport apparatus as claimed in claim 1, wherein the restricting means and the pump are immersed in the refrigerant to improve lubrication.

17. A two-component gas/liquid refrigerant suitable for use in a heat transport apparatus of the absorption-compression type, comprising a lubricant as a liquid component, and a gaseous component absorbable in said lubricant.

18. The refrigerant as claimed in claim 17, wherein the lubricant is selected from the group of compounds consisting of hydrocarbons having $C_9$–$C_{17}$ carbon chains, hydrocarbons having a boiling point in the range 180° C.–300° C., lubricating oils with low viscosity, polyalphaolefins, polyglycols, silicone oils and synthetic esters, long chain polyalcohols, alkylaminoesters, aliphatic naphtha or mixtures thereof.

19. The refrigerant as claimed in claim 18, wherein the lubricant has a viscosity of 1–40 $mm^2/s$.

20. The refrigerant as claimed in claim 19, wherein the lubricant has a viscosity of 1.5–20 $mm^2/s$.

21. The refrigerant as claimed in claim 20, wherein the lubricant has a viscosity of 2–10 $mm^2/s$.

22. The refrigerant as claimed in claim 17 wherein liquid component comprises diesel fuel.

23. The refrigerant as claimed in claim 17, wherein the gaseous component comprises a hydrocarbon.

24. The refrigerant as claimed in claim 23, wherein the hydrocarbon has 1–5 carbon atoms.

25. The refrigerant as claimed in claim 17, wherein said hydrocarbon comprises iso-butane.

26. The refrigerant as claimed in claim 17, wherein said gaseous component comprises an ether.

27. The refrigerant as claimed in claim 26, wherein the ether is ethyl ether.

28. The refrigerant as claimed in claim 17, wherein said gaseous component comprises liquefied petroleum gas.

29. A method of transporting heat from a low temperature and a low pressure to a high temperature and high pressure, comprising:

a) providing a two-component refrigerant comprising a lubricant as a liquid component, and a gaseous component absorbable in said lubricant;

b) pumping the gaseous component of said refrigerant from a desorbator at low pressure and low temperature to an absorbator at high pressure and high temperature by using a compressor means, whereby heat is released in the absorbator; and c) returning the liquid component from said absorbator to said desorbator.

30. The method of claim 29, wherein said lubricant is selected from the group of compounds consisting of hydrocarbons having $C_9$–$C_{17}$ carbon chains, hydrocarbons having a boiling point in the range 180° C.–300° C., lubricating oils with low viscosity, polyalphaolefins, polyglycols, silicone oils and synthetic esters, long chain polyalcohols, alkylaminoesters, aliphatic naphtha or mixtures thereof.

* * * * *